Feb. 9, 1971  M. MALLET ETAL  3,562,767
APPARATUS FOR THE CONTINUOUS DISTRIBUTION OF EXPANDABLE LIQUIDS
Filed Nov. 1, 1968  2 Sheets-Sheet 1

Inventors
Michel Mallet
Georges Zeller
By Cushman, Darby & Cushman
Attorneys

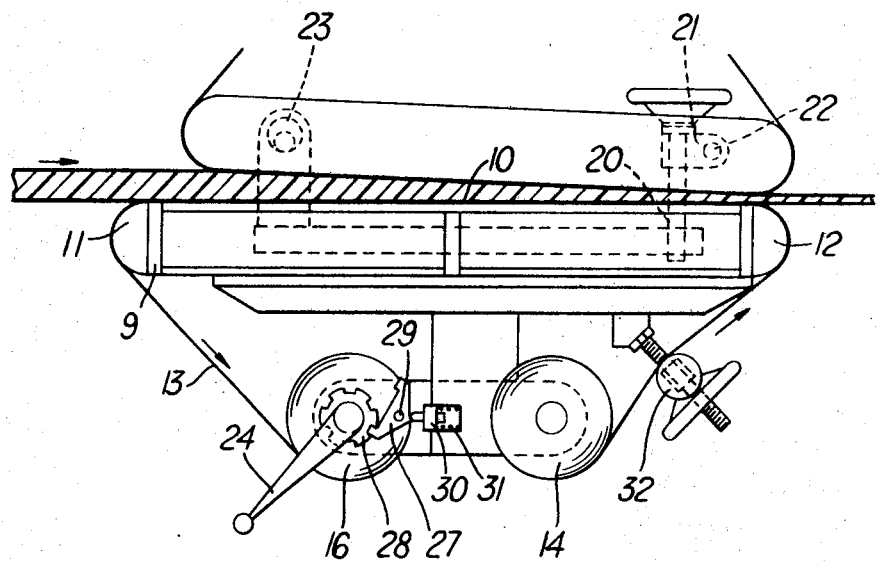

United States Patent Office 3,562,767
Patented Feb. 9, 1971

3,562,767
APPARATUS FOR THE CONTINUOUS DISTRIBUTION OF EXPANDABLE LIQUIDS
Michel Mallet and Georges Zeller, Lyon, France, assignors to Rhone-Poulenc S.A., Paris, France, a body corporate of France
Filed Nov. 1, 1968, Ser. No. 772,698
Claims priority, application France, Nov. 2, 1967, 126,795
Int. Cl. B29d 7/14
U.S. Cl. 18—4                                    7 Claims

ABSTRACT OF THE DISCLOSURE

The specification describes an apparatus for the continuous distribuiton of expandable liquids, such as polyurethane, between two fixed, smooth plate surfaces. Between each of the foils and associated plate surfaces a film e.g. of poly(ethylene glycol terephthalate) is moved relative to both the foil and plate surfaces, preferably in the opposite direction to the foils. The coefficient of sliding friction between the films and foils is less than 1, preferably less than 0.5.

---

Figure 1:
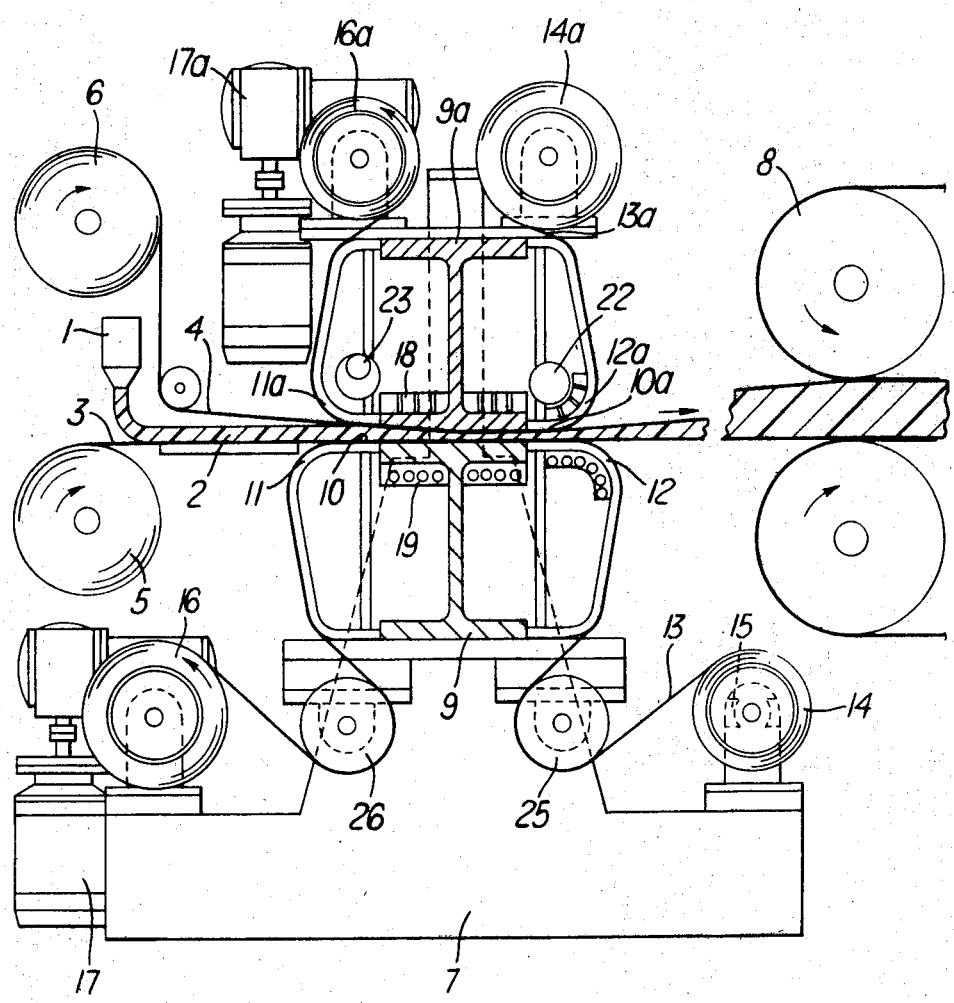

The present invention relates to an apparatus and process for the continuous distribution of expandable liquid mixtures over a uniform selected height in between two foils which are drawn between two fixed walls by any suitable means.

Such devices are in particular used for the continuous manufacture of sheets of expanded material. These sheets consist of a supple, semi-rigid or rigid foam which is expanded between two foils, the foam being obtained from a liquid mixture of an artificial or synthetic resin with chemical products of reacting with one another and causing an evolution of gas which produces the expansion of the mixture.

The viscosity of the liquid mixture can be high and this makes its uniform distribution over the support film difficult. The liquid mixture is distributed after casting between two foils and preferably before expansion in order that it shall be uniform at all points and allow sheets to be obtained which consist of a regular foam having good mechanical characteristics. However the slightest non-uniformity of distribution is then multiplied by the coefficient of expansion of the foam, which may reach 30, 40 or more. It will be appreciated that under these conditions it is important for the quality of the resulting sheets to be able to adjust the height of the liquid mixture which is distributed between the foils, over the entire desired width, to a very high precision which is generally better than 0.1 millimetre. This precision is the more difficult to achieve, the wider the sheets manufactured.

Various devices for the distribution of expandable liquids between two foils are known. The simplest consists of two parallel cylinders turning in opposite directions and carrying the films with them. It is not always possible to obtain a satisfactory distribution with this device because it suffers from the double disadvantage of retaining liquid upstream in the form of irregular rolls and of driving it downstream. This latter disadvantage still persists, when a device is used which comprises a series of parallel rollers of which the successive spacings progressively decrease. A conveyor device having movable converging walls is also known, these walls for example consisting of endless steel belts which carry the foils which retain the liquid to be distributed. However, this device generally does permit a guaranteed distribuiton of the expandable liquid to a desired thickness with sufficient precision, particularly over large widths.

A known device, which consists of two fixed surfaces which converge at an angle of less than 10° and preferably less than 5° permits satisfactory distribution of the expandable liquid over a desired height to be achieved with precision. In such a device the foils which contain the liquid mixture rub along the fixed surfaces, the friction forces being the greater, the higher the pressure exerted by these fixed surfaces and the greater the distribution work.

If these frictional forces become too great they can interfere with the travel of the foils between which the liquid mixture in distributed and one risks deforming or even tearing them. Furthermore this friction causes wear of the opposite faces regardless of the nature of the materials used or regardless of the treatments employed to harden their surface. This wear, which manifests itself through the disappearance of the polish which may be present and in the formation of fine parallel streaks spreads non-uniformly and cannot be compensated for strictly by re-adjustment of the relative position of the convergent surfaces. Furthermore this friction can mark the surface of the foils. The abrasion effect resulting from the friction, together with the presence of various remnants on the surface of the foils used, results in a change in the surface of the latter.

If for example sheets of kraft paper are used the pulling off of minute fragments of fibers is observed and it is found that these particles tend to remain wedged between the convergent surfaces and to accumulate there, and this interferes considerably with the desired precision of calibration. This accumulation of material can furthermore exert increasing local constraints on the foils, which are capable of tearing then and causing the machine to stop. Finally, this friction causes a local evolution of calories which is difficult to control and which as a result of raising the temperature of the liquid mixture causes the risk of prematurely initiating its expansion.

In order to avoid these serious disadvantages attempts have been made to reduce the friction against the fixed surfaces of such a spreading device. Suitable shapes of the profile of the converging surfaces have been studied; more appropriate metals have been chosen; and the metals have been subjected to heat treatments and to polishing, but without achieving entirely satisfactory results. Attempts have also been made to coat the metallic surfaces with various plastics having a low coefficient of friction such as polytetrafluorethylene, by spraying followed by polymerisation. However the adhesion obtained is not always satisfactory, the thickness of the layer deposited is not always uniform and the various plastics tried rapidly become scratched.

According to one aspect of the present invention, there is provided an apparatus for the continuous distribution of expandable liquids over uniform heights, such apparatus comprising two rigid members having spaced apart, smooth, oppositely facing surfaces, two flexible foils extending between said smooth surfaces, means for moving said foils in the same direction past said smooth surfaces, a film covering at least one of said smooth surfaces, and extending between and touching said one surface and one of said foils, the coefficient of sliding friction between said film and foil being less than 1, means for moving said film relative to the adjacent smooth surface and relative to the foil and means for feeding liquid between said foils upstream of said smooth surfaces.

There is also provided a process for the expansion of an expandable liquid, such process comprising feeding liquid from the feeding means of the apparatus of the invention, between the foils, to pass between the smooth surfaces, cooling said smooth surfaces and allowing said liquid to expand, and withdrawing the expanded liquid from between the foils.

In order that the invention will be better understood the following description is given, merely by way of example, reference being made to the accompanying drawings, in which:

FIG. 1 is a schematic cross-section of one embodiment of apparatus according to the invention; and FIG. 2 is a fragmentary schematic cross-section of a modified form of a part of this apparatus.

Referring now to the drawings, liquid expandable mixture 2 is cast from the feeding means or distributor 1 between two foils 3 and 4 which are unrolled from rollers 5 and 6, the foils 3 and 4 being drawn at a constant and equal speed through the apparatus by means of a foam shaping device of a known type, shown schematically at 8.

Two similar assemblies are mounted on a chassis 7 and arranged on either side of these foils, the corresponding elements of each assembly being designated by the same numbers, the numbers alone being used for the lower element and the numbers with the suffix $a$ for the upper element. The description given below for one assembly applies equally to the corresponding parts of the other assembly.

A rigid plate 9 has a smooth upper surface 10 which is machined to a precision of better than 0.1 mm., and which has polished rounded edges upstream at 11 and downstream at 12. Alternatively, a cylinder which is free to rotate can be mounted at each end of the surface 10. A film 13 covers the upper surface 10 of this plate and the foil 3 bears against the film, which is unwound from cylinder 14 and is rolled up on a cylinder 16 provided with a driving motor-gearbox unit 17. As shown by the arrows, unit 17 moves the film 13 in the opposite direction to the travel of the foils. The film used has a coefficient of sliding friction of less than 1 relative to the foil and preferably of less than 0.5.

It will be noted that the upper assembly is generally similar to the lower assembly, except for the shape and position of the plate 9a. The lower surface of the latter may be plane as represented in FIG. 2 since this is simple to machine. Alternatively, the lower surface, as in FIG. 1, may consist of two intersecting planes so that the opposite faces of the two plates are initially convergent at an angle of less than 10° and preferably less than 5° and subsequently parallel or divergent at an angle of less than 2°. The position of the upper plate can advantageously be adjustable with precision relative to the lower plate.

The surfaces can however be given any appropriate profile comprising convex or concave zones as required, provided these profiles essentially converge at an angle of less than 10°.

If desired, a cooling device may be arranged against the walls 10 and 10a, over part or the whole of their surface; this device for example consists of a double jacket 18 or of a coil sealed on by a cement which is a good heat conductor 19, or any equivalent device which makes it possible to cool these walls or maintain them at a particular temperature so as to avoid a premature start of the expansion.

The lengths of the convergent-face zone and of the parallel-face zone are not critical. Any suitable ratio of the respective lengths of these two zones may be chosen depending on the data of each particular problem. Downstream from the convergent-face zone, there is provided a zone in which the faces are preferably parallel or diverge at an angle of less than 2°, or a mixed zone in which the faces are parallel and then diverge at an angle of less than 2°. The spacing and convergence of the opposite faces can thus be regulated by precise adjustment of the inclination of the plate 9a relative to the plate 9. This regulation can be effected by any conventional means (see FIG. 2) such as screw-jacks, an endless screw 20 and nut 21, or a combination of a hinge 22 with an eccentric 23.

It is also possible, if desired, to articulate the front and rear elements of the plate 9a about a common axis, which is not shown, in order to keep the rear faces 10 and 10a parallel and independently to regulate the convergence of the front faces 10 and 10a by means of an eccentric 23.

The films are made of any material which in contact with the foils 3 and 4 produces a coefficient of sliding friction of less than 1 and preferably less than 0.5 and which has mechanical properties (tensile strength, elongation, surface hardness etc.) which are sufficient for each particular use. By way of example it is also possible to use metallic foils (copper or aluminium), foils of a single plastic or of a plastic laminate (regenerated cellulose, polyvinyl chloride, polyethylene, polypropylene, polytetrafluorethylene, various linear polyesters etc.) and foils of reinforced plastics (polyethylene cast onto a woven glass fibre fabric etc.). It is however generally preferred to use poly(ethylene glycol terephthalate) foils. The thickness of the film must be strictly constant. It may be between 0.01 and 2 mm. and preferably between 0.1 and 0.3 mm.

Such a film can be unwound, as stated, from the cylinder 14 and wound up on the cylinder 16 which is provided with means 17 for causing it to rotate. The film can also be unrolled in the same direction as that of the foils with the means of moving it along being suitably arranged, provided that the film moves at a different speed from that of the foil with which it is in contact. The cylinder 16 may be driven continuously at a constant speed or it can be moved intermittently with the electric motor being for example controlled by means of a suitably adjusted contact timer. The cylinder 16 may also be driven manually at suitable time intervals by means of a handle 24 (see FIG. 2). The film may be maintained taut by an appropriate braking system 15 acting on cylinder 14.

If desired, the film 13 can be passed over two auxiliary cylinders 25 and 26 arranged on either side of the plate 9 so as to locate the film 13 in a constant position relative to the plate 9 which is independent of the diameter of the cylinders 14 and 16 on which the foil 13 is rolled up and unrolled.

With intermittent movement of the film 13 it is necessary to immobilise this film when it is not being moved. For this purpose an appropriate braking system may be used, or the cylinders 14 and 16 can be equipped with a system of catches 27 such as that represented in FIG. 2. In this example each cylinder has a disc 28 provided with regularly spaced notches over its periphery. The catch 27, which can be moved about an axis 29, is kept engaged in one of these notches by a pusher 30 under the influence of a spring 31. This device makes it possible to avoid any running-back of the cylinders when the drive cylinder is not being driven since the film 13, which is now immobile, is stretched in contact with the foil 3 which is travelling forward regularly.

The notches may be of unsymmetrical shape so as to allow the disengagement of the catch to take place in only one direction of rotation of the cylinder, but it is preferable to use symmetrical notches to prevent any rotation of the cylinders when the catch has not been disengaged, the catch then being disengaged manually or by an appropriate system of cams, not shown which can be caused to rotate by means of the contact timer which controls the drive of the moving cylinder, or by any other equivalent system.

When the film 13 is not being moved it has to be kept between the cylinders 14 and 16 the position of which is fixed by the device of catches described above. The film 13 is in effect in contact with the foil 3 which moves forward regularly and which tends to slacken it between the plate 10 and the downstream cylinder 14, whether the latter is driven or not. It is preferable to arrange an auxiliary cylinder 32 between the plate 10 and the cylinder 14, this auxiliary cylinder being capable of turning freely about its axis and exerting a permanent adjustable pressure along the film 13. This pressure may be achieved by any appropriate means, for example by a screw-jack, by a system of pushers and springs or by a system of a nut and endless screw, the nut being adjustable manually by a handwheel, or by any other equivalent system.

If desired, one or more brushes, not shown, or any other equivalent device may be provided, to rub on one or both faces of the film 13 in order to remove any traces of dust which may accumulate and thus damage the quality of the expanded sheet. These brushes are arranged in the immediate vicinity of the plate 10 on the side where the film 13 comes into engagement.

A preferred embodiment consists of arranging the drive cylinder, on which the film 13 is wound up, on the upstream side of the plate. The film 13 is thus pulled in the opposite direction to the travel of the foils 3 and 4 between which the viscous products are distributed. However, the friction between the two foils is minimal because their coefficient of friction is low and the speed of travel of the film 13 may be adjusted to a very low value, for example of the order of 1 centimetre per second. This device has the advantage of avoiding defects in the sheets of expanded foam attributable to deposits of materials on the faces opposite the plates. In effect, these materials cake onto the film 13 and are moved upstream, initially in the zone where the faces are convergent and where the rigorous calibration of the height of the product has not yet been effected, and subsequently outside the distribution device. Thus these materials do not pose the risk of causing defects because they are removed from the zone where the spacing of the opposite faces is a minimum and where the rigorous calibration of the height of the product takes place.

In use, mixture cast onto the foil 3 forms a narrow strip which is immediately covered by the foil 4. The foils 3 and 4 come into contact with the films 13 and 13a which rest on the converging surfaces 10 and 10a of the plates 9 and 9a. Progressively the foils 3 and 4 approach one another to a distance which has beforehand been adjusted with precision and force the product 2 to become progressively distributed over a uniform desired height and a particular width. The foils 3 and 4 are kept in this position within the zone where the faces of the plates 9 and 9a are parallel or essentially parallel so as to reduce possible local non-uniformities and are then drawn out of the distribution device by the shaping device 8.

Simultaneously the films 13 and 13a are unwound from the cylinders 14 and 14a, and slide over the oppositely facing surfaces 10 and 10a of the plates 9 and 9a, in the opposite direction to the direction of travel of the foils 3 and 4. It has been found that under these conditions thin foils can be maintained and displaced at a particular speed, without creasing or tearing.

The apparatus according to the invention makes it possible continuously to distribute very many expandable liquids between two foils over a precisely calibrated uniform height. It is particularly advantageous for the distribution of liquids of high viscosity over a very small height and large width. It is obvious that it can also distribute liquids which are not capable of foaming, and also various products of high viscosity, for example glues, coatings, paints, varnishes.

The following examples illustrate the use of the apparatus.

EXAMPLE 1

The apparatus shown in FIG. 2 is used, the upper face of the lower plate being plane, horizontal, and made of steel which has been planed to a precision of 0.02 mm. over a length of 540 mm. and a usable width of 550 mm., with the ends being polished and rounded to a radius of 32 mm. The upper plate resembles the lower plate having a plane face of the same dimensions.

These plates form a space which is defined by two plane faces converging at an angle of 1° and their minimum spacing is adjusted to a value of 1.30 mm. by four nuts and endless screws.

Each of the opposite faces is covered with a film of poly(ethylene glycol terephthalate) of thickness 0.250 mm. and 500 mm. width. Each cylinder is blocked by the system of catches 27 which can be unlocked manually. An auxiliary cylinder 32 of diameter 40 mm., turning freely about its axis, keeps the film 13 stretched through a system of two endless screws and nuts integral with the handwheel.

1000 gm./m.$^2$ of liquid polyurethane are cast between two sheets of kraft paper which are drawn between the two plates at a speed of 2.80 m./minute by means of a shaping device 8. The coefficient of sliding friction between the poly(ethylene glycol terephthalate) films and the kraft paper is 0.20.

The two films 13 and 13a are simultaneously moved upstream by 300 mm. in 10 seconds by driving the cylinders 16 and 16a (not shown) manually. The cylinders are then immobilised by means of the catches and the films 13 and 13a are kept stretched and immobile for a period of 15 minutes. The same operations are then restarted in this way for 1 hour.

A sheet of a rigid foam of expanded polyurethane is obtained having a constant thickness of 20 mm. and consisting of a foam of uniform structure. The profile of the sheet thus obtained is smooth and free of irregularities.

A multitude of small fragments of fibres caked onto the poly(ethylene glycol terephthalate) films is observed after the films have been in contact with the kraft paper. On the other hand no trace of wear of the faces opposite the plates is observed after about 100 hours' running.

EXAMPLE 2

A plate having the same characteristics as in Example 1 is manufactured by means of the same machine. However the cylinders 16 and 16a are now driven continuously by means of electric motors and speed reduction equipment and the two films of poly(ethylene glycol terephthalate) are moved upstream at a constant speed of 2 cm./minute. The result is equivalent to that observed in Example 1.

EXAMPLE 3

A sheet similar to the sheet described in Example 1 is manufactured by means of a machine described in Example 1 but the kraft paper sheets are replaced by aluminium foils of a thickness of 0.6 mm. and the minimum spacing of the plates is adjusted to a value of 2.3 mm. Fine longitudinal scratches are observed on the poly(ethylene glycol terephthalate) films and no trace of wear on the faces opposite the plates, and the sheets obtained are neither scratched nor deformed.

EXAMPLE 4

The machine described in Example 1 is used and the minimum spacing of the convergent plates is reduced to 0.9 mm. 550 g./minute of liquid polyurethane is cast and a sheet of thickness 8 mm. is obtained. Sheets of kraft paper which are only 0.09 mm. thick, and weighing 72 g. per square metre, are used. It is found that under the influence of the pressure exerted by the convergent faces 10 and 10a the liquid passes through the paper to a slight extent and moistens the external faces. It is found that after 1 hour's running the sheets obtained have a regular profile and their thickness is constantly 8 mm.

The manufacture of such sheets is restarted on the same device but with the poly(ethylene glycol terephthalate) films being omitted and the convergent faces 10 and 10a being now directly in contact with the kraft paper. After a quarter of an hour's running the sheets obtained are of reduced thickness and irregular. The spacing between the convergent plates, previously adjusted to 0.40 mm., is found to be reduced to 0.30 mm.

The faces 10 and 10a are irregularly covered with polyurethane and minute fragments of fibres. The machine has to be stopped and cleaned after a quarter of an hour's running.

We claim:
1. Apparatus for the continuous distribution of expandable liquids to form sheets having uniform thickness, said apparatus comprising, in combination:
   (a) two rigid members;
   (b) spaced apart smooth oppositely facing surfaces to said members;
   (c) two flexible foils extending over said smooth surfaces;
   (d) means for moving said foils in the same direction past said smooth surfaces;
   (e) a film in sliding relation with and covering at least one of said smooth surfaces, and extending between and touching said one surface and one of said foils, the coefficient of sliding friction between said film and foil being less than 1;
   (f) separate means for moving said film relative to the adjacent smooth surface and relative to the film; and
   (g) means for feeding liquid between said foils upstream of said smooth surfaces.

2. Apparatus as claimed in claim 1, wherein said smooth surfaces converge initially in the direction of travel of said foils at an angle of less than 10°.

3. Apparatus as claimed in claim 2, wherein said smooth surfaces converge initially in the direction of travel of said foils at an angle of less than 5°.

4. Apparatus as claimed in claim 3, wherein said smooth surfaces subsequently diverge in the direction of travel of said foils at an angle of less than 2°.

5. Apparatus as claimed in claim 1, wherein the coefficient of friction between said film and foil is less than 0.5.

6. Apparatus as claimed in claim 1, wherein said means for moving said film are effective to move said film in the opposite direction to the direction of movement of said foils.

7. Apparatus as claimed in claim 1 and further comprising means for cooling said smooth surfaces of said rigid members.

References Cited
UNITED STATES PATENTS

| | | | |
|---|---|---|---|
| 3,044,111 | 7/1962 | Caughey | 18—4B |
| 3,065,500 | 11/1962 | Berner | 18—4B |
| 3,099,518 | 7/1963 | Wetzler | 18—4BX |
| 3,110,941 | 11/1963 | Fagg | 18—4BX |
| 3,142,864 | 8/1964 | Pelley | 18—4B |

WILLIAM S. LAWSON, Primary Examiner